(12) United States Patent
Lu et al.

(10) Patent No.: US 12,399,354 B2
(45) Date of Patent: Aug. 26, 2025

(54) LIGHT ENERGY COLLECTING SYSTEM AND DETECTION APPARATUS

(71) Applicant: Suzhou VDO Biotech Co., Ltd., Suzhou (CN)

(72) Inventors: Guohua Lu, Suzhou (CN); Jingzhang Wu, Suzhou (CN); Wen Wen, Suzhou (CN)

(73) Assignee: Suzhou VDO Biotech Co., Ltd., Suzhou (CN)

( * ) Notice: Subject to any disclaimer, the term of this patent is extended or adjusted under 35 U.S.C. 154(b) by 364 days.

(21) Appl. No.: 18/316,088

(22) Filed: May 11, 2023

(65) Prior Publication Data
US 2024/0126056 A1    Apr. 18, 2024

(30) Foreign Application Priority Data

Oct. 12, 2022    (CN) .......................... 202211249985.2

(51) Int. Cl.
*G02B 19/00*    (2006.01)
*G02B 9/10*    (2006.01)

(52) U.S. Cl.
CPC ........... *G02B 19/0028* (2013.01); *G02B 9/10* (2013.01); *G02B 19/0076* (2013.01)

(58) Field of Classification Search
None
See application file for complete search history.

(56) References Cited

U.S. PATENT DOCUMENTS

| | | | | |
|---|---|---|---|---|
| 2,596,799 A * | 5/1952 | Tillyer | ................ | G02B 13/00 501/130 |
| 6,510,007 B1 * | 1/2003 | Blasenheim | ........... | G02B 21/02 359/659 |
| 7,110,192 B2 * | 9/2006 | Sauter | ................ | G02B 21/02 359/756 |
| 2002/0094116 A1 * | 7/2002 | Frost | ................ | C40B 60/10 382/129 |
| 2004/0217256 A1 * | 11/2004 | Ortyn | ................ | G01N 15/1459 250/201.4 |
| 2012/0274925 A1 * | 11/2012 | Chen | ................ | G01N 21/534 356/73 |

FOREIGN PATENT DOCUMENTS

| | | |
|---|---|---|
| CN | 103091821 A | 5/2013 |
| CN | 111929226 A | 11/2020 |
| CN | 113008768 A | 6/2021 |
| WO | WO 2015/084676 A1 | 6/2015 |

OTHER PUBLICATIONS

Extended European Search Report for European Application No. 23168867.2, dated Mar. 4, 2024.

* cited by examiner

*Primary Examiner* — Robert E. Tallman
(74) *Attorney, Agent, or Firm* — Wolf, Greenfield & Sacks, P.C.

(57) ABSTRACT

The present disclosure relates to a light energy collecting system and a detection apparatus. Some embodiments of the present disclosure provide a light energy collecting system and a detection apparatus, to correct chromatic aberration, simplify system structure, and improve system reliability and stability.

13 Claims, 4 Drawing Sheets

LIGHT ENERGY COLLECTING SYSTEM AND DETECTION APPARATUS

TECHNICAL FIELD

The present disclosure relates to the technical field of optical instrument analysis, and in particular, to a light energy collecting system and a detection apparatus.

BACKGROUND

In some detection apparatuses, such as flow cytometers, the analytes (such as cells or particles) suspended in a liquid flow or a gas flow are arranged in a row and kept advancing sequentially in the center of a flow channel of the flow chamber. The light source irradiates the analytes which sequentially pass through the flow channel in a vertical direction, resulting in forward-angle scattered light and side-angle scattered light. If the analytes are marked with a fluorescent dye, it will also generate fluorescence signals which scatter to various angles in the space. The scattered light including fluorescent is collected and then converted into electrical signals through a photoelectric conversion device, and finally converted into digital signals that can be processed by computers which can be used to analyze the characteristics of the analytes.

Light energy collecting includes two steps of work, the first is to collect the light emitted by the analytes, and the second is to converge the collected light to convert it into the subsequent optical path for the photoelectric conversion process. Wherein, in the application field of flow cytometry, the fluorescence signal is the key information for analyzing the analytes, the more fluorescent light energy is collected and utilized, the higher the reliability of the signal and the more accurate the analysis, which is also beneficial to the identification and analysis of smaller-scale analytes. Therefore, improving the collection efficiency of the light collection optical system is the key to improving the reliability of the detection apparatus.

However, the current light energy collecting system cannot solve the problems of correcting chromatic aberration, system complexity or poor reliability, and high cost at the same time.

SUMMARY

Some embodiments of the present disclosure provide a light energy collecting system and a detection apparatus, to correct chromatic aberration, simplify system structure, and improve system reliability and stability.

In some embodiments, a light energy collecting system comprising: a flow chamber, comprising a first side and a second side opposite to each other; a reflector, glued on the first side of the flow chamber; and a cemented doublet, comprising a first outer side which is planar and cemented to the second side of the flow chamber; the cemented doublet comprising a negative focal power lens and a positive focal power lens cemented to each other, the refractive index of the negative focal power lens is greater than the refractive index of the positive focal power lens, and the Abbe number of the negative focal power lens is smaller than the Abbe number of the positive focal power lens.

The technical solutions of embodiments of the present disclosure have the following advantages: the light energy collecting system provided by some embodiments of the present disclosure, wherein a cemented doublet is arranged which comprises a negative focal power lens and a positive focal power lens cemented together, and the refractive index of the negative focal power lens is greater than that of the positive focal power lens, and the Abbe number of the negative focal power lens is smaller than the Abbe number of the positive focal power lens, thereby utilizing the dispersion properties of positive and negative focal power lenses with different refractive indices and Abbe numbers, the dispersion can be compensated for each other to achieve the purpose of correcting or eliminating chromatic aberration, which is beneficial to obtain a smaller focused spot and correspondingly improve the concentration of light energy.

Moreover, the first outer side of the cemented doublet is planar such that the first outer side of the cemented doublet can be fully glued to the second side of the flow chamber, which is beneficial to improve the bonding strength of the cemented doublet and the flow chamber, and correspondingly prevents the mis-alignment between cemented doublet and the flow chamber during use, which affects the focusing effect, and prevents dust from entering the optical surface due to partial degumming and cracking on the edge which is difficult to remove, thereby improving the reliability of the light energy collecting system. In addition, the negative focal power lens and the positive focal power lens of the cemented doublet are cemented to each other, so that no additional structure is required for fixing and assembly, and there is no need to coat the first outer side of the cemented doublet and the second side of the flow chamber, which is beneficial to simplify the structure of light energy collecting system, reduce the cost, thereby improving the stability of the light energy collecting system.

In some embodiments, the cemented doublet further comprising a second outer side opposite to the first outer side, and the second outer side is aspheric.

In some embodiments, the cemented doublet further comprising a second outer side opposite to the first outer side, and the second outer side is aspheric, compared with the solution of correcting the aberration with only one aspherical lens, some embodiments of the present disclosure adds an additional lens (that is, the lens of which the outer side is used as the first outer side) glued with the aspheric lens, which is beneficial to further correct chromatic aberration, thereby helping obtain a smaller focused spot and correspondingly improving the concentration of light energy.

In some embodiments, the cemented surface between the negative focal power lens and the positive focal power lens is spherical.

In some embodiments, the negative focal power lens is a plano-concave lens, a plane of the negative focal power lens is configured as the first outer side of the cemented doublet, and a concave surface of the negative focal power lens is cemented with the positive focal power lens; the cemented doublet further comprising a second outer side opposite to the first outer side, a side of the positive focal power lens opposite to the negative focal power lens is configured as the second outer side of the cemented doublet.

In some embodiments, the positive focal power lens is a plano-convex lens, a plane of the positive focal power lens is configured as the first outer side of the cemented doublet, and a convex surface of the positive focal power lens is cemented with the negative focal power lens; the cemented doublet further comprising a second outer side opposite to the first outer side, a side of the negative focal power lens opposite to the positive focal power lens is configured as the second outer side of the cemented doublet.

In some embodiments, the difference between the refractive index of the negative focal power lens and the refractive index of the positive focal power lens is greater than or equal to 0.15.

In some embodiments, the difference between the Abbe number of the positive focal power lens and the Abbe number of the negative focal power lens is greater than or equal to 10.

In some embodiments, a second outer side of the cemented doublet is coated with an anti-reflection film.

In some embodiments, a flow channel is arranged inside the flow chamber; the first side and the second side are both parallel to the flow channel.

In some embodiments, the reflector is a plano-convex mirror, and a plane of the reflector is glued on the first side of the flow chamber.

In some embodiments, the surface of the reflector opposite to the flow chamber is aspheric.

In some embodiments, a detection apparatus, comprising: the light energy collecting system provided by the present disclosure; and a photoelectric detection module, configured to detect the light energy collected by the light energy collecting system and convert it into electrical signals.

The technical solutions of embodiments of the present disclosure have the following advantages: the detection apparatus provided by some embodiments of the present disclosure, wherein the light energy collecting system is arranged, the light energy collecting system can effectively correct the chromatic aberration to obtain a smaller focused spot, resulting high light energy collecting efficiency, which is beneficial to improve the efficiency of the photoelectric detection module to detect and photoelectrically convert the light energy collected by the light energy collecting system, thereby improving the detection and analysis efficiency of the detection apparatus; moreover, the reliability and stability of the light energy collecting system are high, and the structure is simple and the cost is low, which is beneficial to improve the reliability and stability of the detection apparatus, simplify the structure of the detection device and reduce the cost.

In some embodiments, the detection apparatus is a flow cytometer.

BRIEF DESCRIPTION OF THE DRAWINGS

The accompanying drawings, which comprise a part of this specification, illustrate several embodiments and, together with the description, serve to explain the principles and features of the disclosed embodiments. In the drawings.

DETAILED DESCRIPTION

It can be seen from the prior art that the current light energy collecting system cannot solve the problems of correcting chromatic aberration, system complexity or poor reliability, and high cost at the same time. Combining two light energy collecting systems, we analyze the reasons why the problems of correcting chromatic aberration, system complexity or poor reliability, and high cost cannot be solved at the same time.

Figure 1:
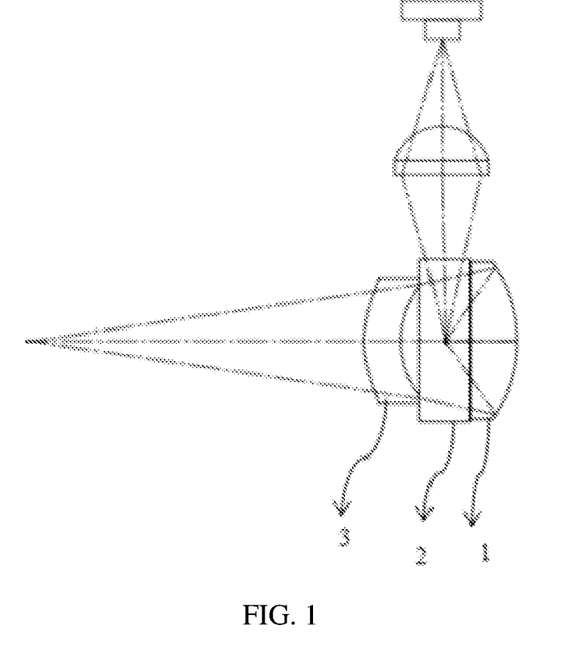
FIG. 1 is a schematic diagram of a structure of a light energy collecting system.

FIG. 1 is a schematic diagram of a structure of a light energy collecting system.

Referring to FIG. 1, the light energy collecting system shown in FIG. 1 comprises:
flow cell 2; and
an objective lens group is configured to collect the side scattered light and fluorescence excited by the laser light irradiating the particles in the center of the flow cell 2; the objective lens group includes a first lens 1 and a second lens 3 arranged coaxially in sequence, the plane of the first lens 1 is glued and fixed to the broadside of the flow cell 2 through optical glue, and the concave surface of the second lens 3 is opposite to the plane of the flow cell 2; wherein, the first lens 1 is a spherical lens with positive focal power, and the second lens 3 is a meniscus aspheric lens with a combination of positive focal power aspheric surface and negative focal power.

In the light energy collecting system shown in FIG. 1, only a single aspherical lens is used to correct part of the aberration. However, a single aspheric lens cannot effectively correct chromatic aberration, resulting in a limited effect on improving the concentration of the spot.

Moreover, the first lens 1 is a meniscus aspheric lens, and the meniscus aspheric lens is only glued to the flow cell 2 at the peripheral non-transparent part, but the effective aperture is not glued to the flow cell 2, resulting in a small glued area and poor bonding strength, which makes that the first lens 1 easy to peel off from the flow cell 2 by an external force, or dust easy to enter into the glued surface which is difficult to remove when there are local small cracks on the glued surface, thereby further affect the convergence of light energy; furthermore, the meniscus aspheric lens is only glued with the flow cell 2 at the peripheral non-transparent part, to increase the transmittance of light energy, it is necessary to coat the two light-passing surfaces of the meniscus aspheric lens and the surface of the flow cell 2 opposite to the meniscus aspheric lens, thereby resulting in more surfaces need to be coated with anti-reflection films and easily leading to higher costs.

Figure 2:
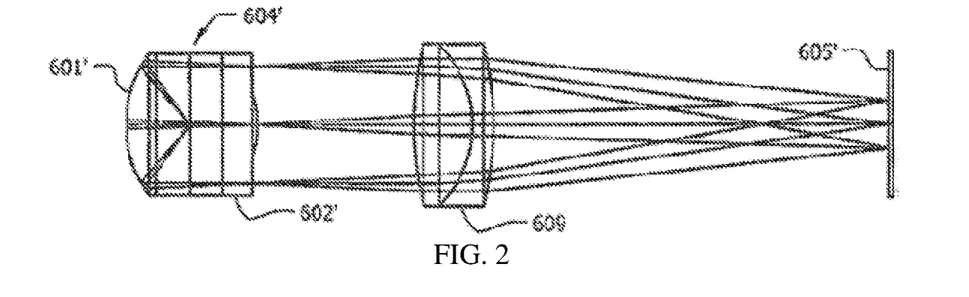
FIG. 2 is a schematic diagram of a structure of another light energy collecting system.

FIG. 2 is a schematic diagram of a structure of another light energy collecting system.

The light energy collecting system shown in FIG. 2 comprises: a prismatic glass test tube, comprising a flow channel 604'; a reflector 601', comprising a first side optically coupled to the prismatic glass test tube; corrector plate 602', comprising a flat surface and an aspheric surface opposite to each other, the flat surface optically coupled to a second side of the prismatic glass test tube; and a color-compensating doublet lens 609, inserted between the corrector plate 602' and an image plane 605', and the color compensating doublet lens 609 is spaced apart from the corrector plate 602'.

In the light energy collecting system shown in FIG. 2, the residual chromatic aberration introduced by the aspheric corrector plate 602' is corrected by the color-compensating doublet lens 609. However, the color compensation doublet lens 609 is set separately from the prismatic glass test tube, and an additional structure is required to fix and assemble the color compensation doublet lens 609, which results in a relatively complicated process and structure as well as high requirements on the stability of the system, thereby leading to high cost and poor system reliability.

To solve the technical problem, some embodiments of the present disclosure provide a light energy collecting system, wherein a cemented doublet is arranged which comprises a negative focal power lens and a positive focal power lens cemented together, and the refractive index of the negative focal power lens is greater than that of the positive focal power lens, and the Abbe number of the negative focal power lens is smaller than the Abbe number of the positive focal power lens, thereby utilizing the dispersion properties of positive and negative focal power lenses with different refractive indices and Abbe numbers, the dispersion can be compensated for each other to achieve the purpose of correcting or eliminating chromatic aberration, which is beneficial to obtain a smaller focused spot and correspondingly improving the concentration of light energy.

Moreover, the first outer side of the doublet is planar such that the first outer side of the doublet can be fully glued to the second side of the flow chamber, which is beneficial to improve the bonding strength of the cemented doublet and the flow chamber, and correspondingly prevents mis-alignment between the cemented doublet and the flow chamber during use, which affects the focusing effect, and prevents dust from entering the optical surface due to partial degumming and cracking on the edge which is difficult to remove, thereby improving the reliability of the light energy collecting system. In addition, the negative focal power lens and the positive focal power lens of the cemented doublet are cemented to each other, so that no additional structure is required for fixing and assembly, and there is no need to coat the first outer side of the cemented doublet and the second side of the flow chamber, which is beneficial to simplify the structure of light energy collecting system, reduce the cost, thereby improving the stability of the light energy collecting system.

In some embodiments, the cemented doublet further comprising a second outer side opposite to the first outer side, and the second outer side is aspheric, compared with the solution of correcting the aberration with only one aspherical lens, some embodiments of the present disclosure adds an additional lens (that is, the lens of which the outer side is used as the first outer side) glued with the aspheric lens, which is beneficial to further correct chromatic aberration, thereby helping obtain a smaller focused spot and correspondingly improving the concentration of light energy.

Figure 3:
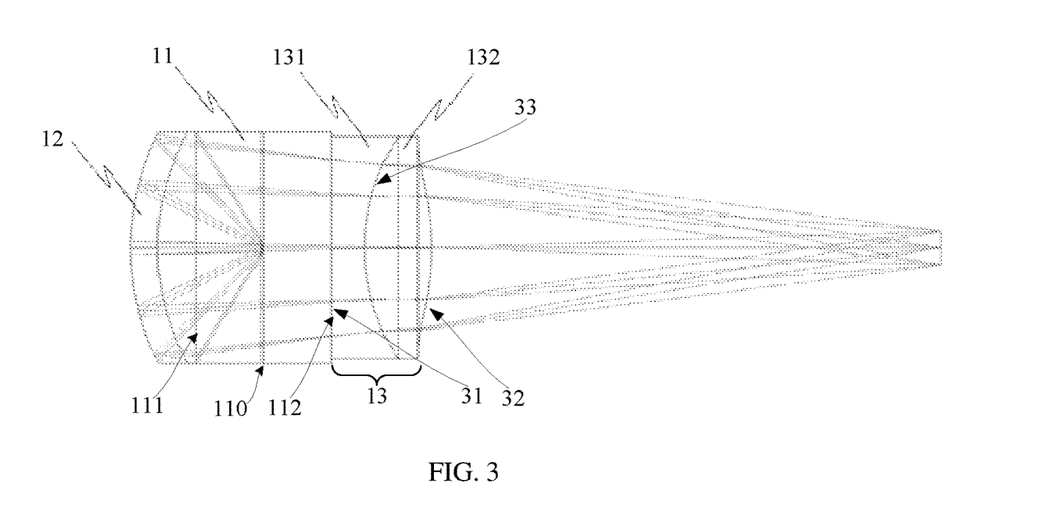
FIG. 3 is a structural schematic diagram of an embodiment of the light energy collecting system provided by the present disclosure.

To make the above objects, features, and advantages of the embodiments of the present disclosure more comprehensible, specific embodiments of the present disclosure will be described in detail below in conjunction with the accompanying drawings. Referring to FIG. 3, shows a schematic structural diagram of an embodiment of the light energy collecting system of the present disclosure.

As shown in FIG. 3, in an embodiment, a light energy collecting system comprising: a flow chamber 11, comprising a first side 111 and a second side 112 opposite to each other; a reflector 12, glued on the first side 111 of the flow chamber 11; and a cemented doublet 13, comprising a first outer side 31 which is planar and cemented to the second side 112 of the flow chamber 11; the cemented doublet 13 comprising a negative focal power lens 131 and a positive focal power lens 132 cemented to each other, the refractive index of the negative focal power lens 131 is greater than the refractive index of the positive focal power lens 132, and the Abbe number of the negative focal power lens 131 is smaller than the Abbe number of the positive focal power lens 132.

The flow chamber 11 is configured to provide a flow channel 110 for the analytes so that the analytes (such as cells or particles, etc.) can be arranged in a row and sequentially advance in the center of the flow chamber 11, and a light source can irradiate the analytes passing sequentially in the direction perpendicular to the flow direction of the analytes, and then scattered light is generated which can be collected by the light energy collecting system. Wherein, when the analytes are marked with a fluorescent dye, fluorescence can also be generated when the light source irradiates the analytes, and correspondingly, the light energy collecting system can also collect fluorescent signals.

Specifically, in an embodiment, there is a flow channel 110 inside the flow chamber 11, the flow channel 110 is configured to provide a channel of flowing for the liquid flow or gas flow containing the analytes so that the light source can irradiate the analytes in a direction perpendicular to the flow channel 110.

In an embodiment, the analytes can be cells or particles, etc.

In this embodiment, the flow channel 110 is disposed in the center of the flow chamber 11.

In this embodiment, the flow chamber 11 comprises a first side 111 and a second side 112 opposite to each other, the first side 111 and the second side 112 are both parallel to the flow channel 110, so that the light source can irradiate the analytes in a direction perpendicular to the flow channel 110 to generate scattered light, thereby the reflector 12 and the cemented doublet 13 correspondingly on the first side 111 and the second side 112 of the flow chamber 11 respectively can collect scattered light (including fluorescence).

In this embodiment, the first side 111 and the second side 112 of the flow chamber 11 are both planar, which is not only convenient for manufacturing, but also facilitates the bonding between the flow chamber 11 and the reflector 12 and the cemented doublet 13 respectively, further improving the bonding strength and reliability between flow chamber 11 and reflector 12 and cemented doublet 13.

The material of the flow chamber 11 is a light-transmitting material. As an example, the material of the flow chamber 11 is glass, such as fused silica (F_silica). In other embodiments, based on actual design requirements, other suitable materials can also be used for the flow chamber.

The reflector 12 is configured to reflect and converge the scattered light generated by the analytes flowing in the flow chamber 11, which facilitates the correction of aberration and chromatic aberration by the cemented doublet 13 to obtain a smaller focused spot.

In this embodiment, the reflector 12 is a plano-convex mirror, and a plane of the reflector 12 is glued on the first side 111 of the flow chamber 11, thus, the plane of the reflector 12 can be glued to the flow chamber 11 on the entire surface, thereby increasing the glued area of the reflector 12 and the flow chamber 11, improving the bonding strength and stability between the reflector 12 and the flow chamber 11, and correspondingly improving the reliability of the light energy collecting system.

In this embodiment, the surface of the reflector 12 opposite to the flow chamber 11 is aspheric, compared with the spherical surface of the reflector on the side opposite to the flow chamber, the aspherical surface allows the reflector 12 to reflect and converge the scattered light generated on the analytes while reducing aberrations, thereby improving the thinness of the reflector 12 and reduce the volume of the light energy collection system accordingly.

More specifically, in an embodiment, the convex surface of the reflector 12 is aspheric.

Correspondingly, in this embodiment, the reflector 12 is relatively thin. In an embodiment, the thickness of the reflector 12 is 1.95 mm. In other embodiments, based on actual design requirements, the thickness of the reflector can also be other values.

In other embodiments, based on actual design requirements, the surface of the reflector on the side opposite to the flow chamber can also be a spherical surface, which is beneficial to save costs.

In this embodiment, the convex surface of the reflector 12 is coated with an internal reflection film, thereby improving the reflective effect of the reflector 12 on the scattered light generated on the analytes.

In this embodiment, the material of the reflector 12 is optical glass, such as D-k9 and the like.

The cemented doublet 13 is configured to transmit the light reflected by the reflector 12 to correct aberrations and chromatic aberrations, to obtain a smaller focused spot, thereby improving the concentration of light energy.

In this embodiment, the cemented doublet 13 comprises a negative focal power lens 131 and a positive focal power lens 132 cemented together, and the refractive index of the negative focal power lens 131 is greater than that of the positive focal power lens 132, and the Abbe number of the negative focal power lens 131 is smaller than the Abbe number of the positive focal power lens 132, thereby utilizing the dispersion properties of positive and negative focal power lenses with different refractive indices and Abbe numbers, the dispersion can be compensated for each other to achieve the purpose of correcting or eliminating chromatic aberration, which is beneficial to obtain a smaller focused spot and correspondingly improve the concentration of light energy.

Moreover, the first outer side 31 of the cemented doublet 13 is planar such that the first outer side 31 of the cemented doublet 13 can be fully glued to the second side 112 of the flow chamber 11, which is beneficial to improve the bonding strength of the cemented doublet 13 and the flow chamber 11, and correspondingly prevents mis-alignment between the cemented doublet and the flow chamber 11 during use, which affects the focusing effect, and prevents dust from entering the optical surface due to partial degumming and cracking on the edge which is difficult to remove, thereby improving the reliability of the light energy collecting system.

In addition, the negative focal power lens 131 and the positive focal power lens 132 of the cemented doublet 13 are cemented to each other, so that no additional structure is required for fixing and assembly, and there is no need to coat the first outer side 31 of the cemented doublet 13 and the second side 112 of the flow chamber 11, which is beneficial to simplify the structure of light energy collecting system and reduce the cost, thereby improving the stability of the light energy collecting system.

In this embodiment, the cemented surface 33 of the negative focal power lens 131 and the positive focal power lens 132 is arranged opposite to the second side 112 of the flow chamber 11, to allow the light reflected by the reflector 12 to pass through the negative focal power lens 131 and the positive focal power lens 132 sequentially, or pass through the positive focal power lens 132 and the negative focal power lens 131 sequentially, thus, the negative focal power lens 131 and the positive focal power lens 132 can cooperate to reduce chromatic aberration.

In this embodiment, the cemented doublet 13 further comprising a second outer side 32 opposite to the first outer side 31, and the second outer side 31 is aspheric, compared with the solution of correcting the aberration with only one aspherical lens, some embodiments of the present disclosure adds an additional lens (that is, the lens of which the outer side is used as the first outer side) glued with the aspheric lens by setting the cemented doublet 13, which is beneficial to further correct chromatic aberration, thereby helping obtain a smaller focused spot and correspondingly improving the concentration of light energy.

It should be noted that, in this embodiment, the optical axis of the cemented doublet 13 is basically coincident with the optical axis of the reflector 12, so that the cemented doublet 13 can transmit the light reflected by the reflector 12, and then the aberrations and chromatic aberrations can be corrected by the cemented doublet 13.

In this embodiment, the second outer side 132 of the cemented doublet 13 is coated with an anti-reflection film, which is configured to reduce or eliminate the reflected light of the cemented doublet 13 on the second outer surface 132, thereby increasing the amount of light transmitted and reducing or eliminating stray light.

Moreover, in this embodiment, since the first outer side 31 is planar and cemented to the second side 112 of the flow chamber 11, and the negative focal power lens 131 and the positive focal power lens 132 are cemented to each other, there is no need to coat the cemented surface between the first outer side 31 and the flow chamber 11, as well as the cemented surface between the negative focal power lens 131 and the positive focal power lens 132, which is beneficial to simplify the process and save costs.

In this embodiment, the cemented surface 33 between the negative focal power lens 131 and the positive focal power lens 132 is spherical. The spherical lens cementing process is relatively mature, which is beneficial to improve the cementing reliability between the negative focal power lens 131 and the positive focal power lens 132, and is also beneficial to save costs.

In other embodiments, based on actual design requirements, the cemented surface between the negative focal power lens and the positive focal power lens can also be an aspheric surface.

In this embodiment, the negative focal power lens 131 and the positive focal power lens 132 are cemented together by optical glue.

In this embodiment, the cemented doublet 13 comprises a negative focal power lens 131 and a positive focal power lens 132 cemented together, and the refractive index of the negative focal power lens 131 is greater than that of the positive focal power lens 132, and the Abbe number of the negative focal power lens 131 is smaller than the Abbe number of the positive focal power lens 132, the dispersion ability of the negative focal power lens 131 is different from that of the positive focal power lens 132, therefore, the chromatic aberration can be compensated through the combination of two types of lenses with different focal powers, which have strong dispersion ability and weak dispersion ability, and the correction effect on chromatic aberration can be improved, thereby significantly reducing the focused spot and improving the concentration of light energy.

It should be noted that the difference between the refractive index of the negative focal power lens 131 and the refractive index of the positive focal power lens 132 should not be too small, otherwise it is easy to cause the correction effect of the cemented doublet 13 on chromatic aberration to be insignificant. For this reason, in this embodiment, the difference between the refractive index of the negative focal power lens 131 and the refractive index of the positive focal power lens 132 is greater than or equal to 0.15.

It should also be noted that the difference between the Abbe number of the positive focal power lens 132 and the Abbe number of the negative focal power lens 131 should not be too small, otherwise the correction effect of the cemented doublet 13 on chromatic aberration is insignificant. In this embodiment, the difference between the Abbe number of the positive focal power lens 132 and the Abbe number of the negative focal power lens 131 is greater than or equal to 10.

As an example, the material of the negative focal power lens 131 is crown glass, and the material of the positive focal power lens 132 is flint glass, thereby the dispersion ability of the negative focal power lens 131 is greater than the dispersion ability of the positive focal power lens 132, and the refractive index of the negative focal power lens 131 is greater than the refractive index of the positive focal power lens 132.

In other embodiments, the materials of the negative focal power lens and the positive focal power lens can also be other materials that satisfy the relationship between the above-mentioned refractive index and Abbe number.

As an example, the negative focal power lens 131 is a plano-concave lens, a plane of the negative focal power lens 131 is configured as the first outer side 31 of the cemented doublet 13, and a concave surface of the negative focal power lens 131 is cemented with the positive focal power lens 132.

That is to say, in this embodiment, the plane of the negative focal power lens 131 is cemented with the second side 112 of the flow chamber 11, thus the entire plane of the negative focal power lens 131 is cemented on the second side 112 of the flow chamber 11 to increase the cemented area between the cemented doublet 13 and the flow chamber 11, thereby improving the bonding strength and reliability between the cemented doublet 13 and the flow chamber 11, and correspondingly improving the reliability of the light energy collecting system.

Correspondingly, in this embodiment, the concave surface of the negative focal power lens 131 is spherical, that is, the negative focal power lens 131 is a spherical lens, which is beneficial to reduce the cost.

As an example, the thickness of the negative focal power lens 131 is 1 mm, and the thickness of the negative focal power lens 131 is relatively thin, which is conducive to the thinning of the light energy collecting system.

The negative focal power lens 131 is made of optical glass. As an example, the material of the negative focal power lens 131 is H-ZLAF2A. In other embodiments, the material of the negative focal power lens can also be other suitable materials.

Correspondingly, in this embodiment, a side of the positive focal power lens 132 opposite to the negative focal power lens 131 is configured as the second outer side 32 of the cemented doublet 13. That is to say, the side of the positive focal power lens 132 opposite to the negative focal power lens 131 is in contact with air and is an aspheric surface, which is conducive to the thinning of the positive focal power lens 132 and improves the correcting effect of positive focal power lens 132 on aberration.

Correspondingly, in this embodiment, the side of the positive focal power lens 132 cemented with the negative focal power lens 131 is a convex surface. Moreover, in this embodiment, the side of the positive focal power lens 132 cemented with the negative focal power lens 131 is a spherical convex surface, to achieve a close fit with the negative focal power lens 131.

Correspondingly, in this embodiment, the surface of the positive focal power lens 132 opposite to the negative focal power lens 131 is coated with an anti-reflective film.

As an example, the thickness of the positive focal power lens 132 is 2 mm, and the positive focal power lens 132 is relatively thin, which is conducive to thinning the light energy collecting system.

The positive focal power lens 132 is made of optical glass. As an example, the material of the positive focal power lens 132 is H-K50. In other embodiments, the material of the positive focal power lens 132 can also be other suitable materials.

Figure 4:
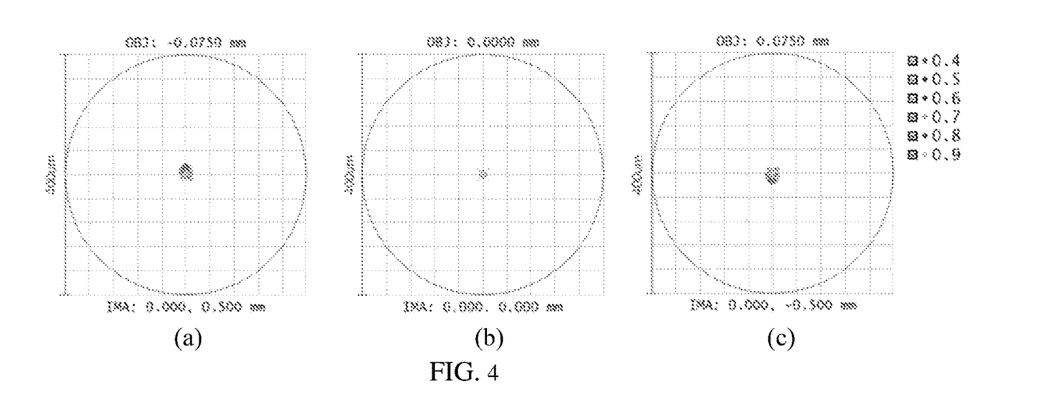
FIG. 4 is a schematic diagram of the focused spot obtained by the light energy collecting system shown in FIG. 3.

Referring to FIG. 4, a schematic diagram of a focused light spot obtained by the light energy collecting system provided in this embodiment is shown. Wherein, FIGS. 4(a), 4(b), and 4(c) are focused spots of image plane (IMA) 0.5 mm and object plane (OBJ) −0.0750 mm, image plane 0.0 mm and object plane 0.0 mm, and image plane −0.5 mm and object plane 0.0750 mm respectively, at scale 400 μm.

As shown in FIG. 4, the focused light spot obtained by the light energy collecting system provided by this embodiment is small, which improves the concentration of light energy.

Figure 5:
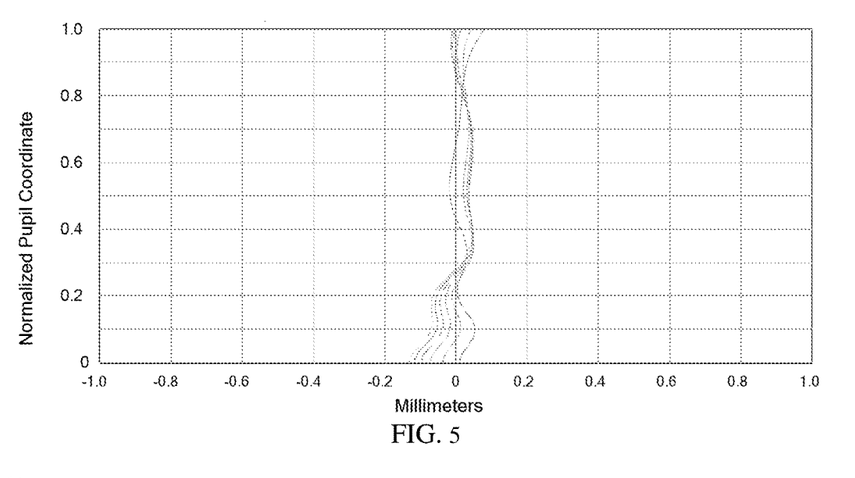
FIG. 5 is a graph of axial chromatic aberration obtained by the light energy collecting system shown in FIG. 3.

Referring to FIG. 5, a graph of axial chromatic aberration obtained by the light energy collecting system provided by this embodiment is shown. As shown in FIG. 5, the abscissa is the spot size (unit: mm/millimeter), and the ordinate is the normalized radius of the lens (Normalized Pupil Coordinate). It can be seen from FIG. 5 that at each position of the ordinate, the range of the light spot of each wavelength is small, that is to say, the light energy collecting system provided by this embodiment can effectively reduce chromatic aberration and obtain a smaller light spot.

Figure 6:
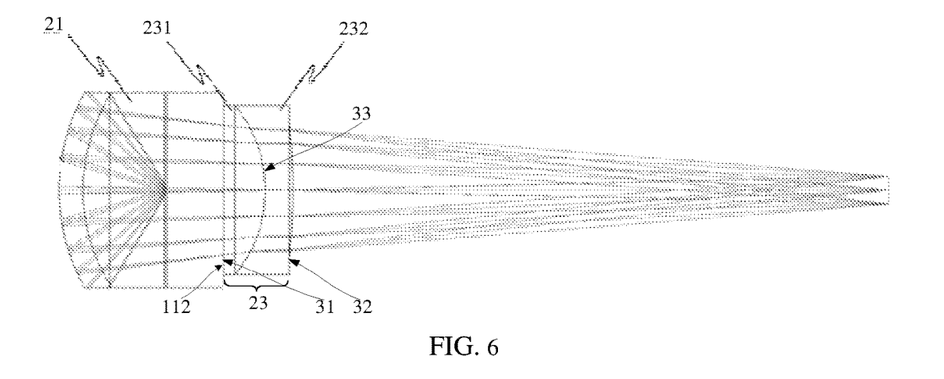
FIG. 6 is a structural schematic diagram of another embodiment of the light energy collecting system provided by the present disclosure.

FIG. 6 is a structural schematic diagram of another embodiment of the light energy collecting system provided by the present disclosure. The similarities between this embodiment and the foregoing embodiments will not be repeated here, and the differences between this embodiment and the foregoing embodiments are:

In this embodiment, the positive focal power lens 231 is a plano-convex lens, a plane of the positive focal power lens 231 is configured as the first outer side 331 of the cemented doublet 23, and a convex surface of the positive focal power lens 231 is cemented with the negative focal power lens 232.

That is to say, in this embodiment, the plane of the positive focal power lens 231 is cemented with the second side 212 of the flow chamber 21, thus the entire plane of the positive focal power lens 231 is cemented on the second side 212 of the flow chamber 21 to increase the cemented area between the cemented doublet 23 and the flow chamber 21, thereby improving the bonding strength and reliability between the cemented doublet 23 and the flow chamber 21, and correspondingly improving the reliability of the light energy collecting system.

Correspondingly, in this embodiment, the convex surface of the positive focal power lens 231 is spherical, that is, the positive focal power lens 231 is a spherical lens, which is beneficial to reduce the cost.

In this embodiment, the thickness of the positive focal power lens 231 is 1.5 mm, and the positive focal power lens 231 is relatively thin, which is conducive to thinning the light energy collecting system. In other embodiments, based on actual design requirements, the positive focal power lens may also have other thicknesses.

Correspondingly, in this embodiment, a side of the negative focal power lens 232 opposite to the positive focal power lens 231 is configured as the second outer side 332 of the cemented doublet 23. That is to say, the side of the negative focal power lens 232 opposite to the positive focal power lens 231 is in contact with air and is an aspheric surface, which is conducive to the thinning of the negative focal power lens 232 and improves the correcting effect of negative focal power lens 232 on aberration and chromatic aberration.

Correspondingly, in this embodiment, the side of the negative focal power lens 232 cemented to the positive focal power lens 231 is a concave surface. Moreover, in this embodiment, the side of the negative focal power lens 232 cemented to the positive focal power lens 231 is a spherical concave surface, to realize a close fit with the positive focal power lens 231.

Correspondingly, in this embodiment, the surface of the negative focal power lens 232 opposite to the positive focal power lens 231 is coated with an anti-reflective film.

As an example, the thickness of the negative focal power lens 232 is 1 mm, and the negative focal power lens 232 is relatively thin, which is conducive to thinning the light energy collecting system. In other embodiments, the negative focal power lens can also have other thicknesses.

In this embodiment, in the cemented doublet 23, the positional relationship and collocation mode between the negative focal power lens 232 and the positive focal power lens 231 are different from those in the foregoing embodiments, thereby providing more options for the cemented doublet 23, correspondingly improving the structural freedom and flexibility of the light energy collecting system.

Figure 7:
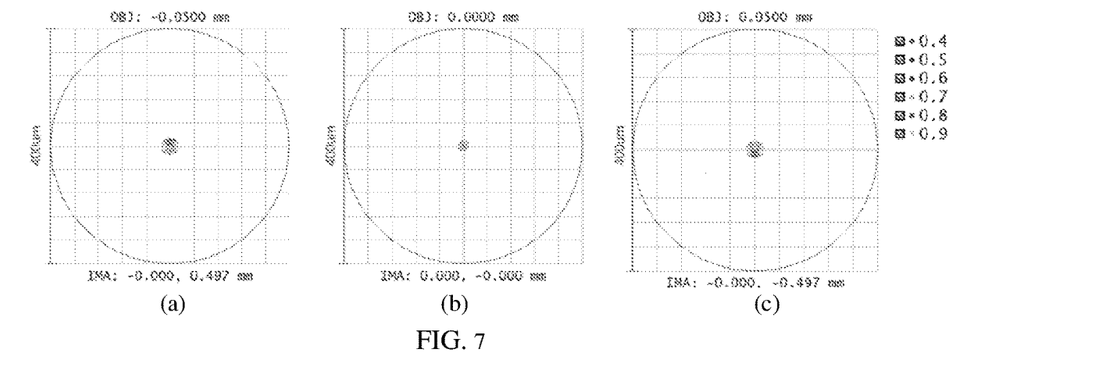
FIG. 7 is a schematic diagram of a focused spot obtained by the light energy collecting system shown in FIG. 6.

Referring to FIG. 7, a schematic diagram of a focused light spot obtained by the light energy collecting system provided by this embodiment. Wherein, FIGS. 7(a), 7(b), and 7(c) are focused spots of the image plane (IMA) 0.497 mm and object plane (OBJ) −0.0500 mm, image plane 0.0 mm and object plane 0.0 mm, and image plane −0.497 mm and object plane 0.0500 mm respectively, at scale 400 μm.

Figure 8:
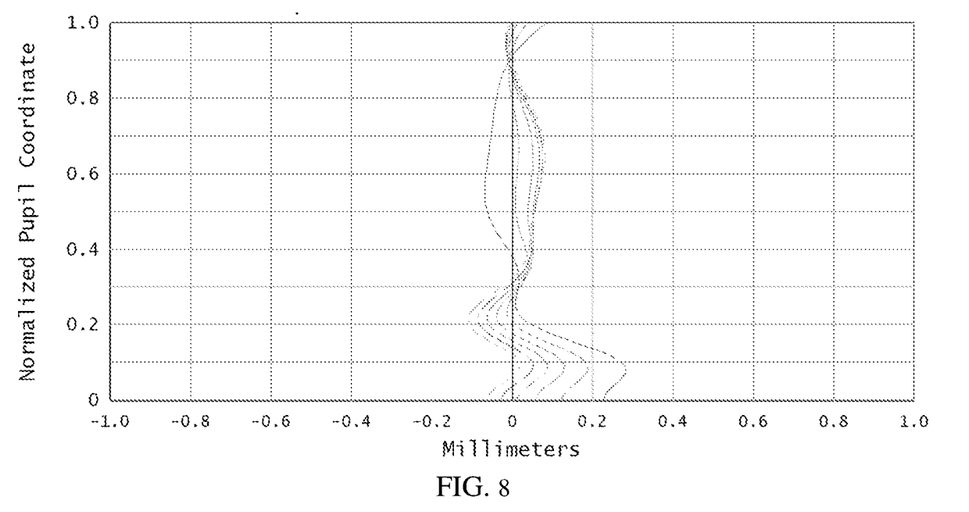
FIG. 8 is a graph of axial chromatic aberration obtained by the light energy collecting system shown in FIG. 6.

Referring to FIG. 8, a graph of axial chromatic aberration obtained by the light energy collecting system provided by this embodiment is shown. As shown in FIG. 8, the abscissa is the spot size (unit: mm/millimeter), and the ordinate is the normalized radius of the lens (Normalized Pupil Coordinate). It can be seen from FIG. 8 that at each position of the ordinate, the range of the light spot of each wavelength is small, that is to say, the light energy collecting system provided by this embodiment can effectively reduce chromatic aberration and obtain a smaller light spot.

Figure 9:
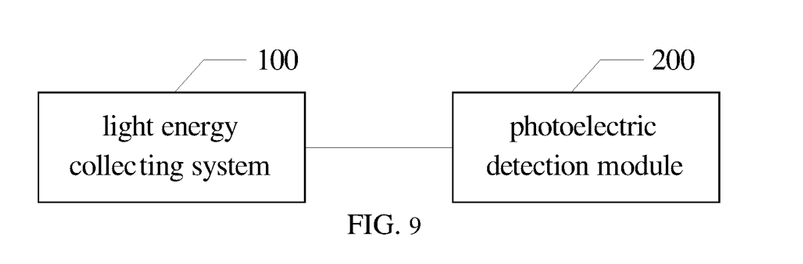
FIG. 9 is a functional block diagram of an embodiment of the detection apparatus provided by the present disclosure.

Correspondingly, the embodiment of the present disclosure also provides a detection apparatus. FIG. 9 is a functional block diagram of an embodiment of the detection apparatus provided by the present disclosure.

As shown in FIG. 9, in this embodiment, the detection apparatus, comprising: the light energy collecting system 100 provided by the foregoing embodiments; and a photoelectric detection module 200, configured to detect the light energy collected by the light energy collecting system 200 and convert it into electrical signals.

The detection apparatus provided by the embodiments of the present disclosure, wherein the light energy collecting system 100 is arranged, the light energy collecting system 100 can effectively correct the chromatic aberration to obtain a smaller focused spot, resulting in high light energy collecting efficiency, which is beneficial to improve the efficiency of the photoelectric detection module 200 to detect and photoelectrically convert the light energy collected by the light energy collecting system 100, thereby improving the detection and analysis efficiency of the detection apparatus; moreover, the reliability and stability of the light energy collecting system 100 are high, and the structure is simple and the cost is low, which is beneficial to improve the reliability and stability of the detection apparatus, simplify the structure of the detection device and reduce the cost.

As an example, the detection apparatus is a flow cytometer, which is configured to detect and analyze the characteristics of the cells. In other embodiments, the detection apparatus can also be other types of detection apparatuses, such as air particle detectors, etc.

The light energy collecting system 100 is configured for collecting and converging the light generated by the analytes, so that the light can be detected by the photoelectric detection module 200.

For the detailed description of the light energy collecting system 100, reference may be made to the corresponding descriptions in the foregoing embodiments, and no further details are given here.

The photoelectric detection module 200 is configured to detect the light energy collected by the light energy collecting system 100 and convert it into electrical signals, thereby realizing photoelectric conversion. The photoelectric detection module 200 includes a photoelectric conversion device, such as a photomultiplier tube (Photo Multiplier Tube, PMT) and the like.

In a specific implementation, the detection apparatus may also include other structures, such as a signal processing module, which is configured to analyze and process the electrical signals to analyze the characteristics of the analytes. The foregoing description of the disclosed embodiments enables those skilled in the art to implement or use the present disclosure. A variety of modifications to these embodiments will be apparent to those skilled in the art, and the general principles defined herein can be implemented in other embodiments without departing from the spirit or scope of the present disclosure. Accordingly, the present disclosure will not be limited to these embodiments shown herein, but will conform to the widest scope consistent with the principles and novel features disclosed herein.

Although the embodiments of the present disclosure are disclosed as above, the present disclosure is not limited therein. Any person skilled in the art may make various changes and modifications without departing from the spirit and scope of the present disclosure, and therefore the scope of protection of the present disclosure shall be subject to the scope defined by the claims.

What is claimed is:

1. A light energy collecting system, comprising:
a flow chamber, comprising a first side and a second side opposite to each other;
a reflector, glued on the first side of the flow chamber; and
a cemented doublet, comprising a first outer side which is planar and cemented to the second side of the flow chamber; the cemented doublet comprising a negative focal power lens and a positive focal power lens cemented to each other, the refractive index of the negative focal power lens is higher than the refractive index of the positive focal power lens, and the Abbe number of the negative focal power lens is smaller than the Abbe number of the positive focal power lens.

2. The light energy collecting system of claim 1, wherein the cemented doublet further comprising a second outer side opposite to the first outer side, the second outer side is aspheric.

3. The light energy collecting system of claim 1, wherein the cemented surface between the negative focal power lens and the positive focal power lens is spherical.

4. The light energy collecting system of claim 1, wherein the negative focal power lens is a plano-concave lens, a plane of the negative focal power lens is configured as the first outer side of the cemented doublet, and a concave surface of the negative focal power lens is cemented with the positive focal power lens;

the cemented doublet further comprising a second outer side opposite to the first outer side, and a side of the positive focal power lens opposite to the negative focal power lens is configured as the second outer side of the cemented doublet.

5. The light energy collecting system of claim 1, wherein the positive focal power lens is a plano-convex lens, a plane of the positive focal power lens is configured as the first outer side of the cemented doublet, and a convex surface of the positive focal power lens is cemented with the negative focal power lens;

the cemented doublet further comprising a second outer side opposite to the first outer side, and a side of the negative focal power lens opposite to the positive focal power lens is configured as the second outer side of the cemented doublet.

6. The light energy collecting system of claim 1, wherein the difference between the refractive index of the negative focal power lens and the refractive index of the positive focal power lens is greater than or equal to 0.15.

7. The light energy collecting system of claim 1, wherein the difference between the Abbe number of the positive focal power lens and the Abbe number of the negative focal power lens is greater than or equal to 10.

8. The light energy collecting system of claim 1, wherein a second outer side of the cemented doublet is coated with an anti-reflection film.

9. The light energy collecting system of claim 1, wherein a flow channel is arranged inside the flow chamber; the first side and the second side are both parallel to the flow channel.

10. The light energy collecting system of claim 1, wherein the reflector is a plano-convex mirror, and a plane of the reflector is glued on the first side of the flow chamber.

11. The light energy collecting system of claim 10, wherein the surface of the reflector opposite to the flow chamber is aspheric.

12. A detection apparatus, comprising:
the light energy collecting system of claim 1; and
a photoelectric detection module, configured to detect the light energy collected by the light energy collecting system and convert it into electrical signals.

13. The detection apparatus of claim 12, wherein the detection apparatus is a flow cytometer.

* * * * *